(12) United States Patent
Rice

(10) Patent No.: US 7,271,729 B2
(45) Date of Patent: Sep. 18, 2007

(54) NOVELTY MOISTURE DETECTOR FOR PLANTS

(76) Inventor: Frank M. Rice, 107 Hatcher's Pass, Greenwood, SC (US) 29646

( * ) Notice: Subject to any disclaimer, the term of this patent is extended or adjusted under 35 U.S.C. 154(b) by 161 days.

(21) Appl. No.: 11/179,761

(22) Filed: Jul. 12, 2005

(65) Prior Publication Data

US 2006/0022835 A1   Feb. 2, 2006

Related U.S. Application Data

(60) Provisional application No. 60/587,890, filed on Jul. 15, 2004.

(51) Int. Cl.
*G08B 21/00* (2006.01)

(52) U.S. Cl. .................. 340/602; 340/604; 340/620; 340/693.5; 47/40.5; 47/48.5; 47/62 R; 47/79

(58) Field of Classification Search ................ 340/602, 340/604, 620, 693.5; 47/40.5, 48.5, 62 R, 47/79

See application file for complete search history.

(56) References Cited

U.S. PATENT DOCUMENTS

| | | | |
|---|---|---|---|
| 3,824,844 A | 7/1974 | Strickland | |
| 3,916,678 A | 11/1975 | Lohoff | |
| 3,951,098 A | 4/1976 | Meyers | |
| 4,020,417 A * | 4/1977 | Brehob et al. | ............. 324/694 |
| 4,055,200 A | 10/1977 | Lohoff | |
| 4,122,389 A * | 10/1978 | Haagen | ...................... 324/694 |
| 4,791,413 A | 12/1988 | Lyczek | |
| 4,992,667 A | 2/1991 | Abelentsev et al. | |
| 5,142,819 A | 9/1992 | Sung | |
| 5,675,931 A | 10/1997 | Wasserman | |
| 5,956,899 A | 9/1999 | Di Orio | |
| 5,969,620 A | 10/1999 | Okulov | |
| 6,128,856 A | 10/2000 | Doan | |
| 6,134,833 A | 10/2000 | Bachman et al. | |
| 6,198,398 B1 * | 3/2001 | Velasquez | ................... 340/604 |
| 6,202,479 B1 * | 3/2001 | Frybarger | ...................... 73/73 |
| 6,397,162 B1 | 5/2002 | Ton | |
| 6,700,395 B1 | 3/2004 | Perry | |

(Continued)

OTHER PUBLICATIONS

Webpage Agriscience Exercise from http://www.uark.edu/depts/aeedhp/agscience/MOISURE.htm/ dated Jun. 14, 2004.

(Continued)

*Primary Examiner*—Tai Nguyen
(74) *Attorney, Agent, or Firm*—Michael A. Mann; Nexsen Pruet Adams Kleemeier, LLC

(57) ABSTRACT

A novel moisture detector for detecting moisture in potting media or soil for plants includes a body formed to represent a creature. Inside the body is a processor and a battery. One or more probes adapted to be inserted into soil extend from the body and send an electrical signal to the processor to indicate a level of moisture proximate to said probes. At least one eye of the creature carries a light emitting diodes (LED) that lights up when the probes are inserted into soil having insufficient moisture. Furthermore, when the user touches one of the eyes, the LED lights as long as the battery has sufficient power to operate the processor.

18 Claims, 3 Drawing Sheets

U.S. PATENT DOCUMENTS

| 7,110,862 B2 * | 9/2006 | Park .......................... 700/284 |
| 2002/0066305 A1 | 6/2002 | Hutchinson et al. |
| 2002/0088177 A1 | 7/2002 | Gergek |

OTHER PUBLICATIONS

Webpage Maplin Electronics Plant Moisture Detector from http://www.maplin.co.uk/noframes/31839.htm dated Jun. 14, 2004.

Webpage 8-Bit Software from http://owl.8bs.com/submit/subji2.htm, dated Jun. 14, 2004.

Webpage Moisture Alarm from http://members.tripod.com/xerxorz/schematics/moisture.html dated Jun. 14, 2004.

Webpage Soil Moisture Neutron Probe Datea (FIFE) from http://www-eosdis.orni.gov/FIFE/Datasets/Soil_Moisture/Soil_Moisture_Neutron_probe dated Jun. 14, 2004.

Article entitled A Wireless, Solar Powered, Acoustic Wave Soil Moisture Detection System (author unknown) from Circuit Cellar (an online magazine) from http://www.circuitcellar.com/fi2003/abstracts/F2002abstract.pdf, dated Jun. 25, 2003.

* cited by examiner

NOVELTY MOISTURE DETECTOR FOR PLANTS

CROSS REFERENCE TO RELATED PATENTS

This application claims benefit of 60/587,890 filed on Jul. 15, 2004.

BACKGROUND OF THE INVENTION

The present invention relates to detectors for use in detecting moisture in potting media for plants. Moisture detectors of this type are well known and several different types are available. Some operate by detecting changes in the electrical resistance or capacitance of the soil near a plant as the level of moisture changes, and indicate, with lights or in other ways, that the level of moisture is inadequate. The user then knows to water the plant.

Furthermore, novelty moisture detectors are also well known. These include detectors with bodies in the form of frogs or other creatures.

Batteries or solar cells connected to rechargeable batteries may be used to power these detectors. It is important to know when the batteries are no longer delivering sufficient voltage to operate the detector. A detector with a dead battery gives the same signal as one indicating sufficient moisture, even when the soil is dry.

Thus, there remains a need for improvements in moisture detectors, regardless of type, that inform the user that the battery power is low.

SUMMARY OF THE INVENTION

According to its major aspects and briefly recited, the present invention is a detector for detecting moisture in potting media, including soil, for plants. The detector includes a body formed to represent a creature that has eyes. The body carries a processor and a battery. At least one probe for insertion into soil extends from the body and sends an electrical signal to the processor to indicate a level of moisture in the soil proximate to the probe. At least one eye of the body includes at least one light emitting diode (LED) that lights up when the probe is inserted into soil and insufficient moisture is detected. Where sufficient moisture for the particular plant is detected, the LED does not light. Furthermore, when no light is being emitted from the detector, a user may confirm that the battery is sufficiently powered to operate the processor by pressing the eye having the LED. Upon depression of the eye, the LED lights provided that the battery has sufficient power to operate the processor.

An important feature of the present invention is the use of the same LED to indicate moisture level and to indicate battery strength. The advantage of this feature is that one component can serve both purposes.

Another important feature of the present invention is the combination of the body in the form of a creature and the use of LED carried in at least one of the eyes. It is common when first looking at a creature of whatever type to look at the eyes. Here the eyes carry the information the user wants to know. When the eyes light up in response to detection of low moisture level, they attract the user's attention even more. Furthermore, when used in a garden, a creature having lighted eyes deters birds and other animals from interfering with the plant.

Still another feature of the present invention is the use of the same LED to indicate insufficient moisture and sufficient battery, as opposed to using a separate test for battery strength. This feature eliminates a variable when troubleshooting the detector. Specifically, if there is insufficient battery strength to light the particular LED during normal detector operation, then the LED will fail to light when the user presses the eye carrying the LED.

These and other features and their advantages will be apparent to those skilled in the art of plant moisture detector design from a careful reading of the Detailed Description of Preferred Embodiments accompanied by the following drawings.

DETAILED DESCRIPTION OF PREFERRED EMBODIMENTS

The present is a novel moisture detector for use in detecting moisture in potting media or soil in the proximity of plants. It detects and indicates whether the level of moisture in soil is sufficient or insufficient for the plant. The detector may be used with potted plants or those planted in flowerbeds, for example. When used in a garden, the detector deters birds and other small animals from interfering with the plant.

The moisture detector is shaped in the form of a creature, that is, an animal having at least one eye or an equivalent to an eye, such as an antenna, rather than being formed in the shape of a plant or inanimate object. The creature is also of a type that is commonly found out of doors, most preferably associated with gardens, and is small animal, such as a frog, toad, turtle, rabbit, bird, or insect. The creature may be realistically presented or fancifully presented. It is important that the body of the present detector be in the shape of a creature having at least one eye.

Figure 1:
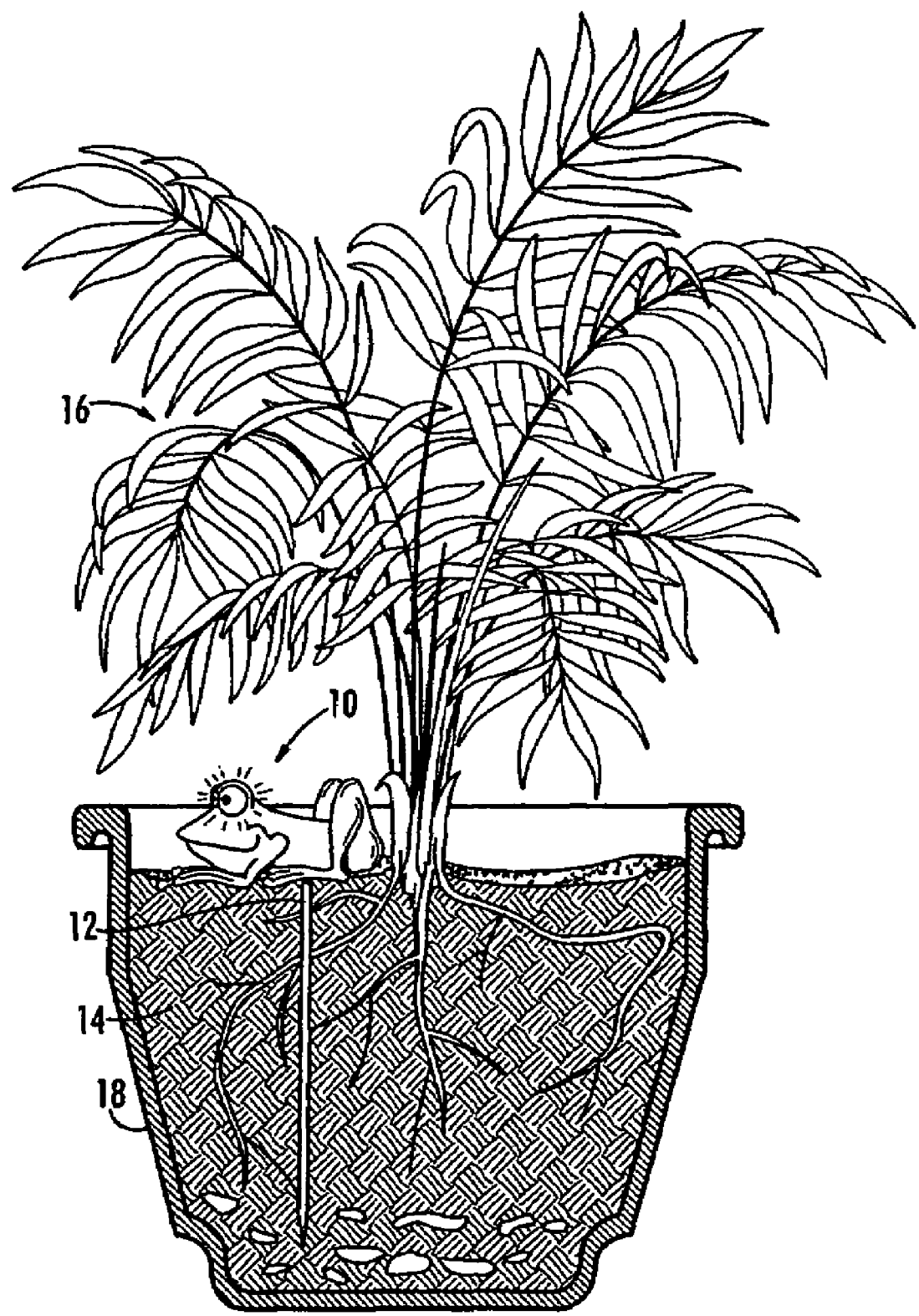
FIG. 1 is a perspective view of a novelty moisture detector shown in a potted plant, according to a preferred embodiment of the present invention.
Figure 2:
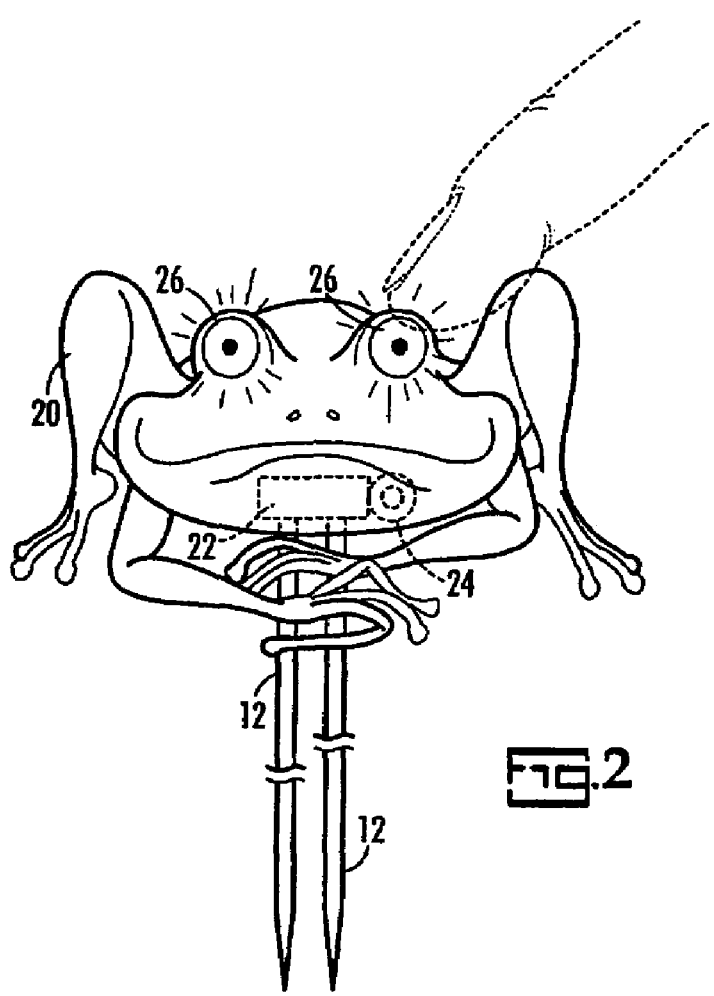
FIG. 2 is a front view of the novelty moisture detector of FIG. 1 with a microprocessor and battery shown in phantom lines.

Referring now to the drawings, FIGS. 1, 2 and 3A and 3B illustrate a moisture detector in the form of a frog and generally indicated with reference number 10. FIG. 1 shows detector 10 with its probes 12 inserted into the soil 14 next to a plant 16 planted in a flowerpot 18. FIG. 2 shows a frontal view of detector 10 as shown in FIG. 1 out of flowerpot 18. FIG. 2 also shows that detector 10 has a body 20 formed to look like a frog. Shown in phantom lines within body 20 is the approximate location of a processor 22 and a battery 24.

Figures 3A, 3B:
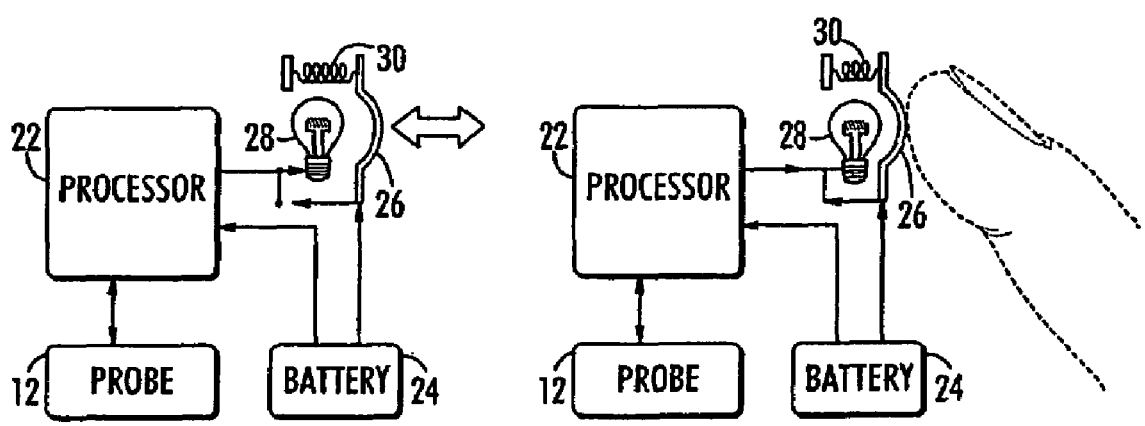
FIGS. 3A and 3B show a schematic diagram of the functional components of the novelty moisture detector, illustrating the electrical connections between processor, battery, probe and LED during normal mode (FIG. 3A) and during battery check mode (FIG. 3B), according to a preferred embodiment of the present invention.

As illustrated schematically in FIGS. 3A and 3B, processor 22 is an electrical device, preferably an integrated circuit, that is able to receive signals from probes 12, compare them to a standard level that has been selected by the user to represent the boundary between a sufficient level of moisture and an insufficient level for a given plant. In the event the moisture level detected is below this selected level, processor 22 will cause power from battery 24 to flow to LED 28 at eye 26, thus lighting up eye 26, to alert the user that there is insufficient moisture in the soil.

Processors capable of determining whether the moisture in adjacent soil is sufficient can be found in a number of devices. See, for example, U.S. Pat. No. 4,791,413 issued to Lyczek, U.S. Pat. No. 6,397,162 issued to To, and published US patent application US 2002/0066305 issued to Hutchinson et al, incorporated herein by reference. The moisture detectors described in these patents also have probes but operate using sensing techniques such as the electrical capacitance or resistance of the soil (but do not have the important additional features of the present invention). The probes may be active, generating a signal, or passive, from which a signal can be extracted by processor 22 by sending an electrical or other signal to probes 12 and evaluating the signal that returns. In an alternative embodiment, a single probe may be used with the conductive elements being separated by a nonconductive insulator.

From the front of detector 10 (see FIG. 2), eyes 26 of body 20 are visible. When probes 12 are inserted into soil 14, they will detect the level of moisture in their proximity and will intermittently send a signal to processor 22 inside body 20. Processor 20 will evaluate that signal, comparing it to the selected signal level, to ascertain whether it indicates a sufficient level of moisture in the adjacent soil. If the level is sufficient, processor 22 does nothing. If, however, the level is insufficient, processor 22 causes the LED 28, carried in at least one of the eyes 26 of body 20, to light, thereby indicating to the user that soil 14 near detector 10 needs water.

Also, as illustrated in FIG. 3B, at least one eye 26 of the creature operates as a switch to allow the user to test the strength of the power source, here battery 24. The user touches eye 26 (see FIGS. 2 and 3B) to close the circuit to battery 24. Eye 26 can be a capacitive switch or a mechanical switch. A mechanical switch would be biased to the off position by a spring 30 so that it returns to the off position when the user removes his finger. The touching of eyes 26 bypasses processor 22 momentarily and causes electrical current from battery 24 (if the battery is not already dead) to flow directly to LED 28 in eye 26 and thus to indicate that battery 24 is good (i.e., has sufficient strength).

Figure 4A:
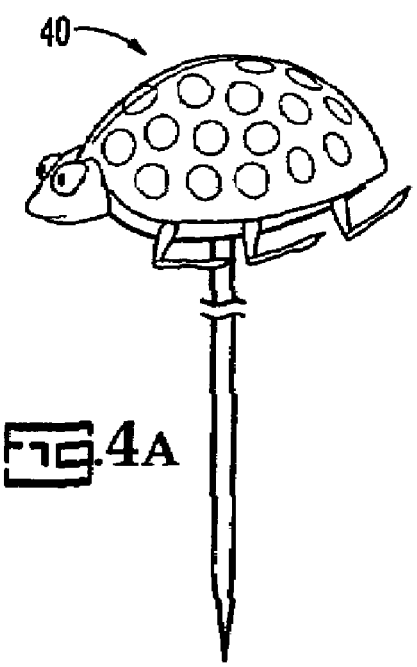
FIGS. 4A, 4B, 4C, and 4D illustrate four alternative novelty moisture detectors, according to preferred embodiments of the present invention.
Figure 4B:
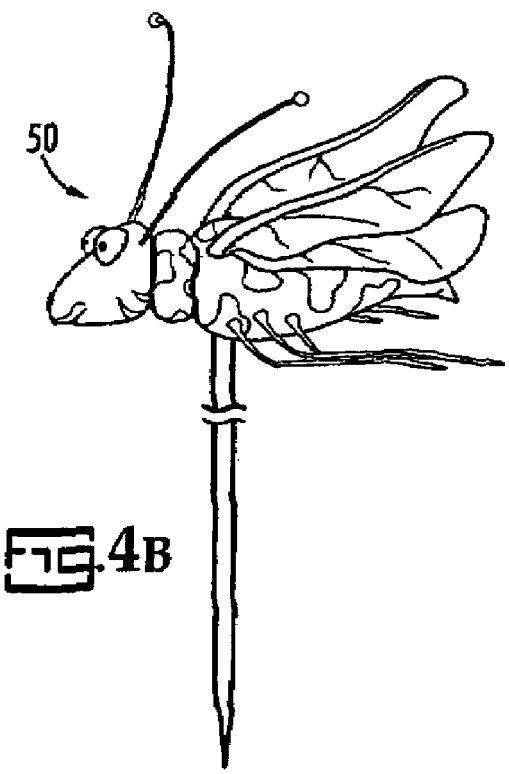
Figure 4C:
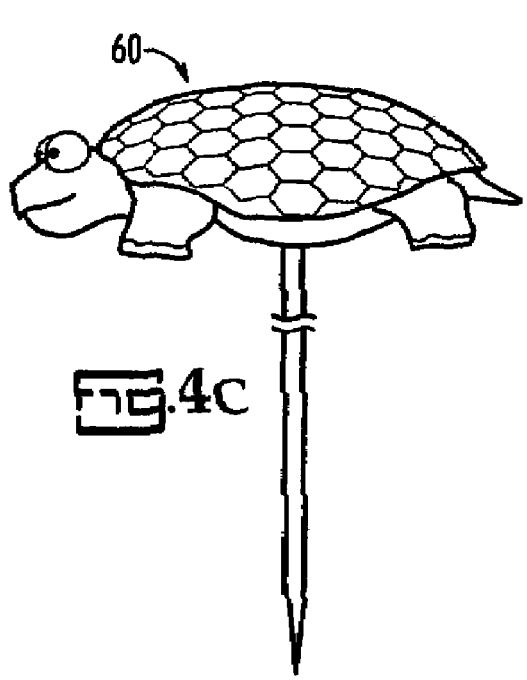
Figure 4D:
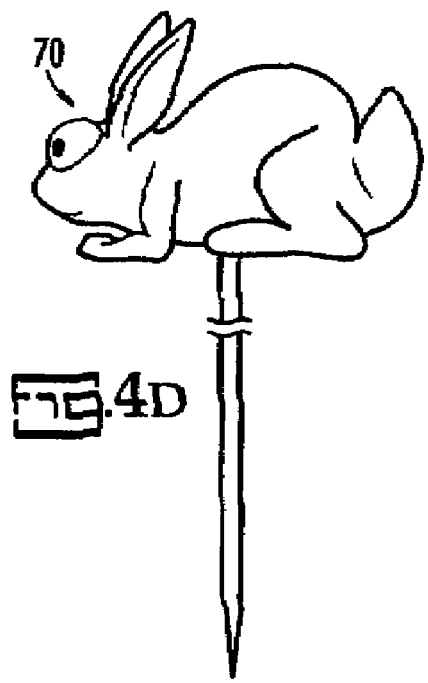

FIGS. 4A-4D illustrate other embodiments of the present invention, namely those with different bodies such as a ladybug 40 (FIG. 4A), an insect 50 (FIG. 4B), a turtle 60 (FIG. 4C) and a bunny 70 (FIG. 4D). All operate in the same manner, by looking at the eyes of the respective creature to see if one or more of them are lit, and if not lit, then the eye that is the battery check switch is pressed to see if it lights. If not, the batteries are changed and the probe is reinserted into the soil, allowed to stabilize, and then the battery check eye is performed again to see if there is now sufficient battery power to light the creature's eyes. The battery check should now result in the eye lighting, since there are fresh batteries in the body, and the detector should then be able to inform the user that there is sufficient moisture in the soil by not lighting. If, on the other hand, the eye lights, there is insufficient moisture and the use may proceed to water the adjacent soil.

It is intended that the scope of the present invention include all modifications that incorporate its principal features, and that the scope and limitations of the present invention are to be determined by the scope of the appended claims and their equivalents. It also should be understood, therefore, that the inventive concepts herein described are interchangeable and/or they can be used together in still other permutations of the present invention, and that other modifications and substitutions will be apparent to those skilled in the art of lamp manufacture from the foregoing description of the preferred embodiments without departing from the spirit or scope of the present invention.

What is claimed is:

1. A moisture detector for detecting moisture in potting media or soil for plants, comprising:
   a body formed to represent a creature having at least one eye;
   a processor housed in said body;
   probes in electrical connection with said processor and extending from said body, said probes being adapted to send an electrical signal to said processor, said signal from said probes indicating a level of moisture proximate to said probes, said processor adapted to receive said signal from said probes;
   a power source housed in said body and in electrical connection with said processor; and
   at least one light emitting diode carried by said body at said at least one eye and in electrical connection with said processor and said power source so that, when said probes are inserted into soil and said level of moisture in said soil is insufficient for a given plant, and said signal from said probes so indicates, said processor causes said power source to light said light-emitting diode, and wherein said processor is adapted to extract a signal from said probes by sending a signal to said probes, and further comprises means for evaluating a return signal that is generated by said probes and returned to said processor.

2. The detector as recited in claim 1, wherein said creature is formed as a realistic presentation or fanciful presentation of an animal having at least one eye or an equivalent to at least one eye, said animal preferably being a small animal of a type that is commonly found out of doors.

3. The detector as recited in claim 1, wherein said processor further comprises an electrical device in electrical connection with said probes, said electrical device preferably comprising an integrated circuit.

4. The detector as recited in claim 1, wherein said processor is programmed with a signal level that can be selected depending upon the moisture requirement of the plant to indicate the lowest acceptable moisture level.

5. The detector as recited in claim 1, wherein said processor further comprises means for comparing said electrical signal to said selected signal level to determine whether said electrical signal is indicative of a sufficient level of moisture in said soil.

6. The detector as recited in claim 5, wherein said processor further comprises means to direct power from said power source to flow to said light emitting diode carried by said body at said eye if said moisture level in said soil is lower than said selected signal level.

7. The detector as recited in claim 5, wherein said processor further comprises means to direct power from said power source to flow to said light emitting diode carried by said body at said eye if said moisture level in said soil is lower than said selected signal level.

8. The detector as recited in claim 1, wherein said eye comprises a switch for testing the strength of said power source.

9. The detector as recited in claim 8, wherein said power source comprises a battery.

10. The detector as recited in claim 8, wherein said switch comprises a capacitive switch or mechanical switch.

11. The detector as recited in claim 10, wherein said mechanical switch is biased to the off position by a spring that is removable from the off position when said eye is touched by a user causing said processor to be momentarily bypassed and the electrical current from said battery to flow directly to said light emitting diode in said eye, causing light to be emitted from said light emitting diode and signify sufficient battery strength.

12. A moisture detector for detecting moisture in potting media or soil for plants, comprising:
- a body formed to represent a creature having at least one eye;
- a processor housed in said body; probes in electrical connection with said processor and extending from said body, said probes being adapted to send an electrical signal to said processor, said signal from said probes indicating a level of moisture proximate to said probes, said processor adapted to receive said signal from said probes;
- a power source housed in said body and in electrical connection with said processor; and
- at least one light emitting diode carried by said body at said at least one eye and in electrical connection with said processor and said power source so that, when said probes are inserted into soil and said level of moisture in said soil is insufficient for a given plant, and said signal from said probes so indicates, said processor causes said power source to light said light-emitting diode, said eye comprising a mechanical switch, wherein said mechanical switch is biased to the off position by a spring that is removable from the off position when said eye is touched by a user causing said processor to be momentarily bypassed and the electrical current from said battery to flow directly to said light emitting diode in said eye, causing light to be emitted from said light emitting diode and signify sufficient battery strength.

13. The detector as recited in claim 12 wherein said creature is formed as a realistic presentation or fanciful presentation of an animal having at least one eye or an equivalent to at least one eye, said animal preferably being a small animal of a type that is commonly found out of doors.

14. The detector as recited in claim 12, wherein said processor further comprises an electrical device in electrical connection with said probes, said electrical device preferably comprising an integrated circuit.

15. The detector as recited in claim 12, wherein said processor is programmed with a signal level that can be selected depending upon the moisture requirement of the plant to indicate the lowest acceptable moisture level.

16. The detector as recited in claim 12, wherein said processor further comprises means for comparing said electrical signal to said selected signal level to determine whether said electrical signal is indicative of a sufficient level of moisture in said soil.

17. The detector as recited in claim 12, wherein said processor is adapted to extract an signal from said probes by sending an electrical or other signal to said probes, and further comprises means for evaluating the signal that is generated by said probes and returned to said processor.

18. The detector as recited in claim 12, wherein said power source comprises a battery.

* * * * *